United States Patent [19]

Nobumoto et al.

[11] Patent Number: 5,060,746
[45] Date of Patent: Oct. 29, 1991

[54] METHOD AND SYSTEM FOR CONTROLLING POWER TRAIN OF VEHICLE

[75] Inventors: Kazutoshi Nobumoto, Hiroshima; Toshiaki Tsuyama, Higashihiroshima; Eiji Nishimura, Hiroshima, all of Japan

[73] Assignee: Mazda Motor Corporation, Hiroshima, Japan

[21] Appl. No.: 510,228

[22] Filed: Apr. 18, 1990

[30] Foreign Application Priority Data

Apr. 20, 1989 [JP] Japan .................... 1-101080

[51] Int. Cl.⁵ ............ B60K 17/34; B60K 20/00; B60K 28/16; B60K 31/00
[52] U.S. Cl. .................... 180/197; 74/866; 364/424.1; 364/426.02
[58] Field of Search .......... 180/197; 364/424.1, 364/426.02; 74/866

[56] References Cited

U.S. PATENT DOCUMENTS

| | | | |
|---|---|---|---|
| 4,873,638 | 10/1989 | Shiraishi et al. | 180/197 |
| 4,873,639 | 10/1989 | Sato et al. | 180/197 |
| 4,933,859 | 6/1990 | Tsuyama et al. | 364/424.1 |
| 4,947,331 | 8/1990 | Speranza | 364/424.1 |
| 4,962,570 | 10/1990 | Hosaka et al. | 180/197 |

FOREIGN PATENT DOCUMENTS 60-176828  9/1985  Japan .

*Primary Examiner*—Mitchell J. Hill
*Attorney, Agent, or Firm*—Fleit, Jacobson, Cohn, Price, Holman & Stern

[57] ABSTRACT

A power train control system for controlling power to be transmitted to a traction wheel of a vehicle from a vehicle engine through an automatic transmission shifts its speed range according to shift patterns depending upon speed of the vehicle and a load of the vehicle engine. When slippage occurring on the traction wheel is detected, the automatic transmission is caused to shift its speed range according to a specific shift pattern for traction control which predetermined according to at least a rotational speed of a driven wheel of the vehicle so as to control the power transmitted to the traction wheels from the vehicle engine, thereby eliminating the slippage.

12 Claims, 6 Drawing Sheets

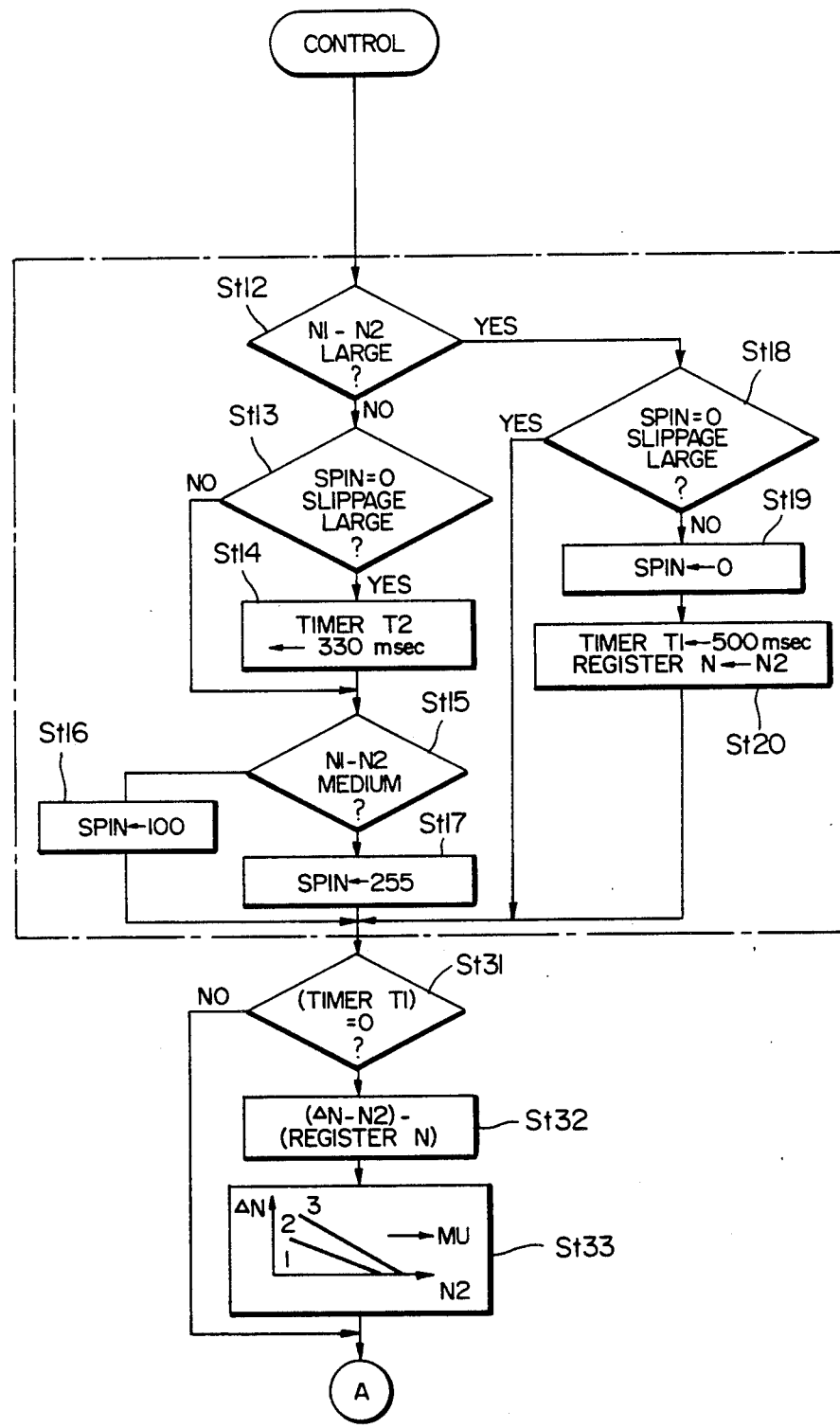

METHOD AND SYSTEM FOR CONTROLLING POWER TRAIN OF VEHICLE

FIELD OF THE INVENTION

The present invention relates to a method and a system for controlling a power train of a vehicle having an automatic transmission with a traction control mechanism.

BACKGROUND OF THE INVENTION

An automatic transmission shifts itself according to shift patterns or schedules according to vehicle speeds, which are generally known from the speed of an output shaft of an automatic transmission or the speed of traction or driving wheels, and throttle openings which depend upon engine loads. Because an automatic transmission automatically shifts itself to a speed range determined depending upon the vehicle speed and throttle opening but independent from a driver's demand, the automatic transmission occasionally shifts itself to a lower speed range than a speed range to which it is desired to shift in order to prevent the traction wheels from slipping when the vehicle is running, for example, on a slippery road.

To avoid such an undesirable shift of the automatic transmission, a power train has been developed with an improved automatic transmission adapted to shift up when some slippages occurs on the traction wheels or with a control system to control traction force of the traction wheels so as to suppress slippages. Such a power train is known from Japanese Unexamined Patent Publication No.60(1985)-176828.

Traction controlling controls a power train to decrease driving or traction force applied to the traction wheels so as to suppress slippages occurring on the traction wheel. The system of traction controlling is, in more detail, adapted to decreasingly vary the changing rate of opening of a throttle valve per a unit stroke of depression of an accelerator pedal, so as to reduce traction force transmitted to the traction wheels sufficiently less, thereby removing a slippage of the traction wheels.

An automatic transmission controlled by the traction control system, under traction controlling, changes temporarily the running speed of the vehicle or the speed of a traction wheel, which is taken as one of shift control parameters, so that it is, larger than a normal speed depending upon slippages of the traction wheel, and restores the normal speed. Accordingly, if the automatic transmission shifts itself to a shift range determined based on a shift pattern or schedule according to the shift control parameter, the shifted speed range is sometimes undesirable and contrary to a driver's intention or an unnecessary shift is sometimes taken.

Additionally, the opening of a throttle valve, representative of engine load, which is another shift control parameter, does not vary exactly responding to an increase or a decrease of engine load according to a driver's demand, so as also to cause the automatic transmission to shift to an undesirable range, contrary to a driver's intention.

SUMMARY OF THE INVENTION

The primary object of the present invention is, therefore, to provide a power train control method and system therefor in which an automatic transmission is controlled to shift to a desirable range under traction control.

The object of the present invention is achieved by a power train control system for a vehicle for transmitting a power of a vehicle engine to a traction wheel or traction wheels of the vehicle through an automatic transmission which shifts its speed range according to shift patterns or schedules depending upon a speed of the vehicle and a load of the vehicle engine. When a slippage occurring on the traction wheel is detected, the automatic transmission is caused to shift its speed range according to a specific shift pattern or schedule for traction control predetermined according to a rotational speed of a driven wheel of the vehicle and/or an opening of throttle valve so as to control the power transmitted to the traction wheel from the vehicle engine, thereby cancelling the slippage occurring on the traction wheel.

BRIEF DESCRIPTION OF THE DRAWINGS

Still other objects of the invention and more specific features will become apparent to those skilled in the art from the following description of the preferred embodiment when considered together with the accompanying drawings, wherein like reference characters have been used in the different figures to denote the same parts.

DESCRIPTION OF THE PREFERRED EMBODIMENT

Because vehicle power trains are well known, the present description will be directed, in particular, to elements forming parts of, or cooperating directly with, the power train control system in accordance with the present invention. It is to be understood that elements not specifically shown or described can take various forms well known to those skilled in the vehicle art.

Figure 1:
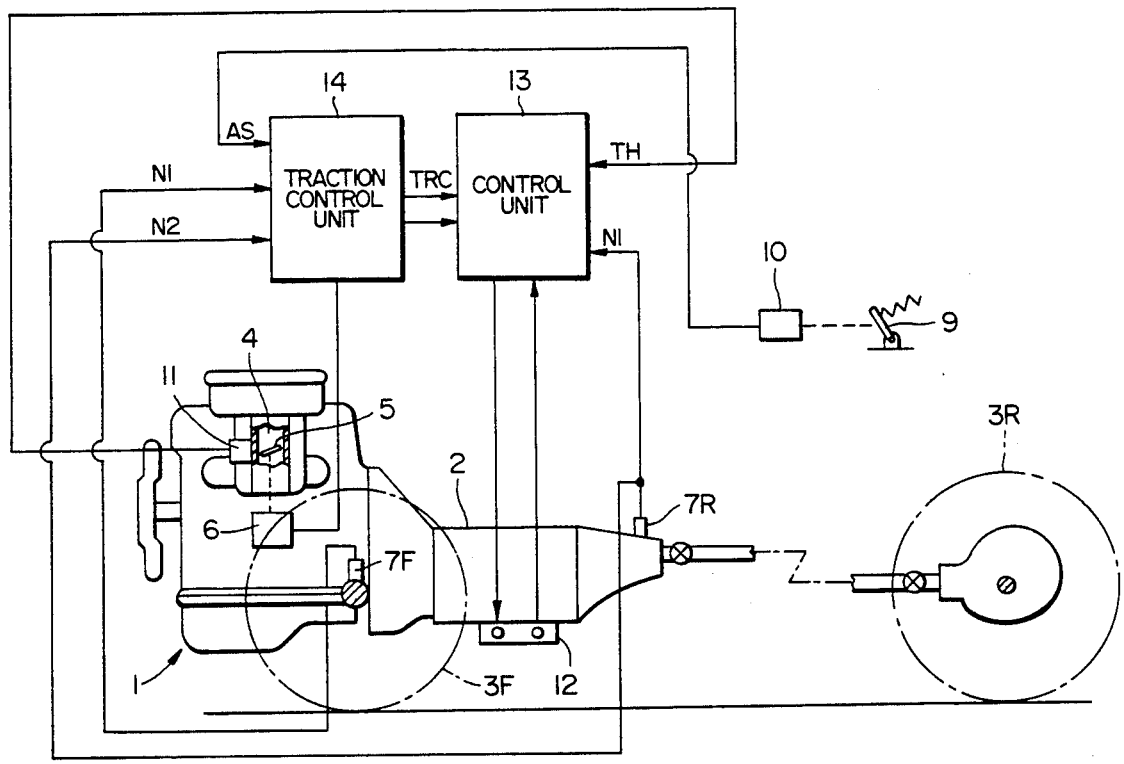
FIG. 1 is a schematic diagram showing an overall traction control system according to a preferred embodiment of the present invention.

Referring to the drawings in detail, and particularly to FIG. 1, a power train of a vehicle engine having a power train control system in accordance with a preferred embodiment of the present invention, which is installed in a rear-wheel drive vehicle, is shown, including a vehicle engine 1 whose output is transmitted to rear, driving or traction wheels 3R through a transmission 2 with a lockup torque converter. The vehicle engine 1 is attached with an intake pipe 4 provided therein with a throttle valve 5 which is actuated by an actuator 6, such as a step motor, to open and close. The opening TH of the throttle valve 5 is detected by a throttle opening sensor 11. An output shaft speed sensor 7R is provided in cooperation with an output shaft (not shown) of the transmission 2 to detect the speed of rotation N1 of the output shaft. In association with front, driven wheels 3F, a front wheel speed sensor 7F is provided to detect the speed of rotation N2 of the front wheel 3F. An accelerator pedal 9, disposed in a driver's compartment, is associated with an accelerator sensor 10 for detecting an operated stroke AS.

The transmission 2 and its lockup clutch are controlled by an electromagnetically controlled hydraulic system 12 whose operation is controlled by an automatic transmission control unit 13 comprising, for example, a single chip microcomputer. The transmission 2, electromagnetically controlled hydraulic system 12 and automatic transmission control unit 13 together constitute an automatic transmission.

The automatic transmission control unit 13 receives outputs representative of information such as the output shaft speed N1 and throttle valve opening TH from the output shaft speed sensor 7R and throttle opening sensor 11, respectively, and other vehicle operating conditions necessary for engine controlling. The automatic transmission control unit 13 controls the engine 1 cooperating with the automatic transmission by a programmed shift pattern or schedule according to the input information. The power train control system of the present invention is provided with a traction control unit 14 connected to the automatic transmission control unit 13 by an interface connection shown in FIG. 2. The traction control unit 14 receives outputs representative of information of the output shaft speed or the traction wheel speed N1 and driven wheel speed N2 from the output shaft speed sensor 7R and front wheel speed sensor 7F to detect an occurrence of traction wheel slippage. When in fact detecting the occurrence of traction wheel slippage, the traction control unit 14 provides the automatic transmission control unit 13 with a traction control signal TRC and performs a programmed traction control so as to regulate the throttle valve 5 open to a proper opening. On the other hand, when no traction wheel slippage is detected, the traction control unit 14 regulates the throttle valve 5 according to a programmed throttle opening schedule shown in FIG. 8, responding to the operated stroke of the accelerator pedal 9.

Figure 2:
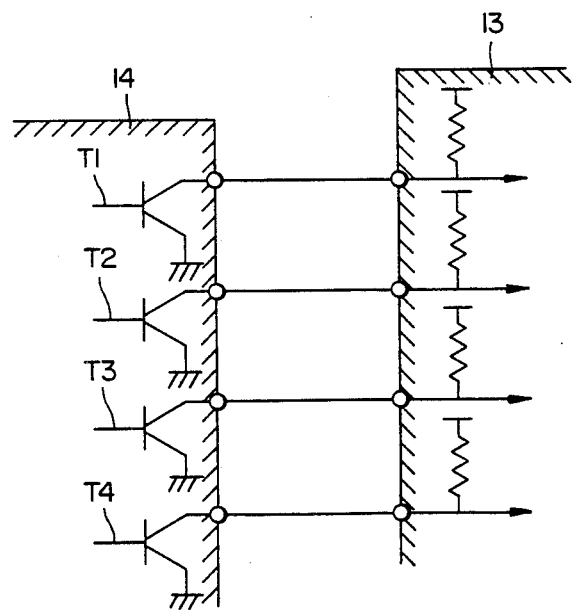
FIG. 2 is an interface between a traction control unit and an automatic transmission control unit of the traction control system of FIG. 1.

As shown in FIG. 2, the interface connection between the control units 13 and 14 comprises transistors T1, T2, T3 and T4 disposed in the traction control unit 14, each of which provides a high or a low level of control signal. The transistor T1 provides the automatic transmission control unit 13 with a shift control mode signal which has a high level for regular shift patterns or schedules or a low level for traction shift patterns or schedules. The transistors T2 and T3 provide the automatic transmission control unit 13 with traction shift control signals representative of a first or the lowest speed range when both these traction shift control signals are at low level, a second speed range when the traction shift control signal from the transistor T2 is at high level and the control signal from the transistor T3 is at low level, a third speed range when the traction shift control signal from the transistor T2 is at low level and the traction shift control signal from the transistor T3 is at high level, or a forth, or highest speed range when both these traction shift control signals are at high level. The transistor T4 provides the automatic transmission control unit 13 with a lockup control signal which has a high level for locking the lockup torque converter or a low level for releasing the lockup torque converter.

Figure 3:
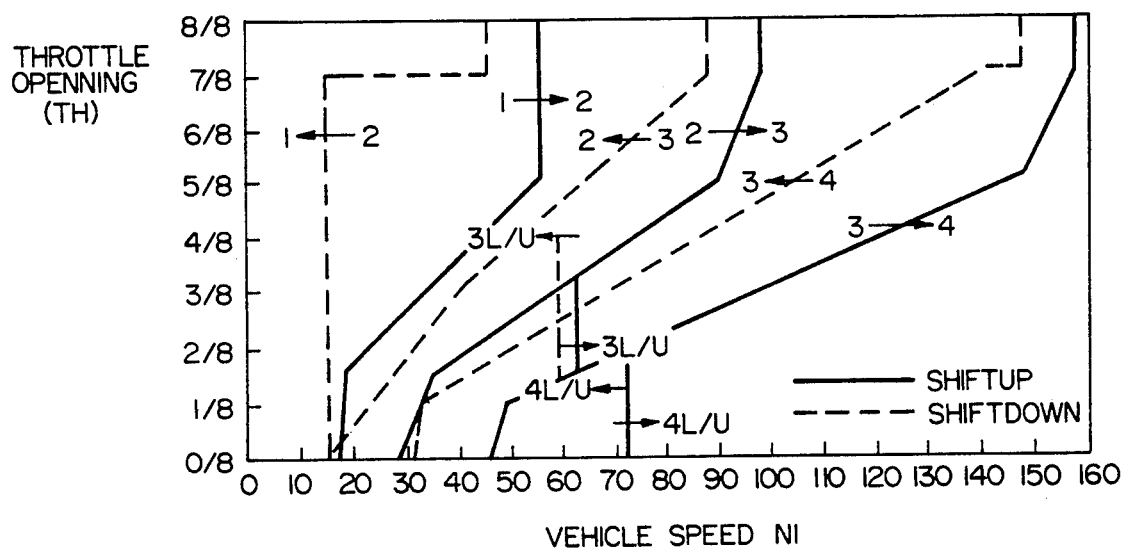
FIG. 3 is a diagram showing a shift control map for normal control mode in a drive range.
Figure 4:
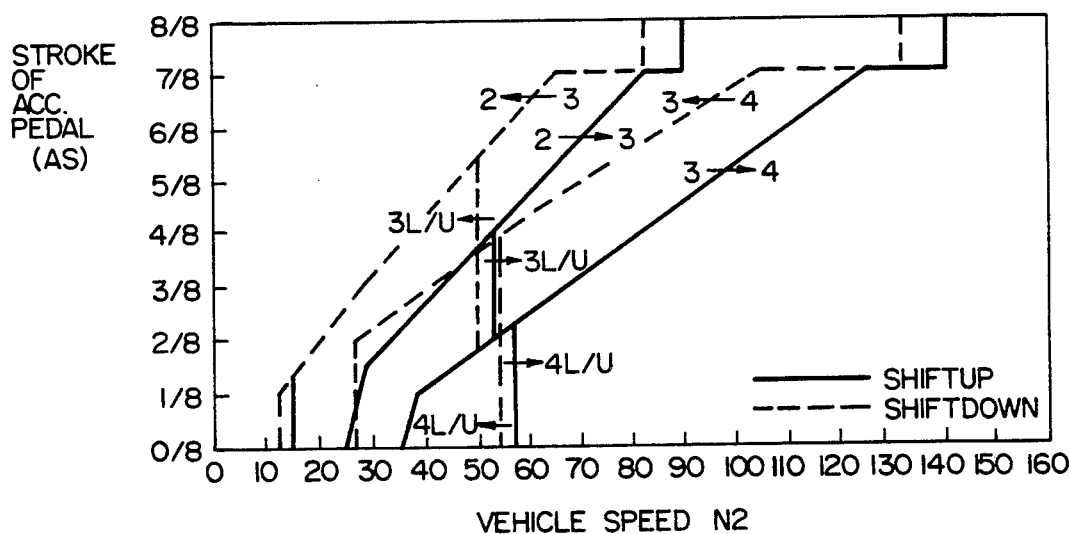
FIG. 4 is a diagram showing a shift control map for traction control mode in a drive range.

FIGS. 3 and 4 show shift patterns or schedules for the power train control system according to the preferred embodiment of the present invention for a normal control mode driving range and a traction control mode driving range, respectively. Programs of these shift patterns in the ordinary driving range and traction control driving range are prepared for the microcomputers of the control units 13 and 14, respectively. In the normal control mode driving range, wherein no slippage of the traction wheels 3 occurs, the automatic transmission is controlled according to one of the shift patterns or schedules shown in FIG. 3 chosen based on a vehicle speed N which is, in this case, of the output shaft speed or the speed N1 of the traction wheels 3R and an opening TH of the throttle valve 5. In the traction control mode driving range, wherein some slippage of the traction wheels 3R occur, the automatic transmission is controlled according to one of the shift patterns or schedules shown in FIG. 4, chosen based on a vehicle speed N2 which is, in this case, the speed N2 of the front wheels 3F and an operated stroke AS of the accelerator pedal 9. As apparent from FIG. 4, a first or the lowest speed range is not provided in the traction control mode driving range so as to avoid the automatic transmission from shifting itself to the first speed range. The traction control unit 14 is of course adapted to prevent both the transistors T2 and T3 from simultaneously providing low level signals when the automatic transmission is in the traction control mode driving range.

Figure 5:
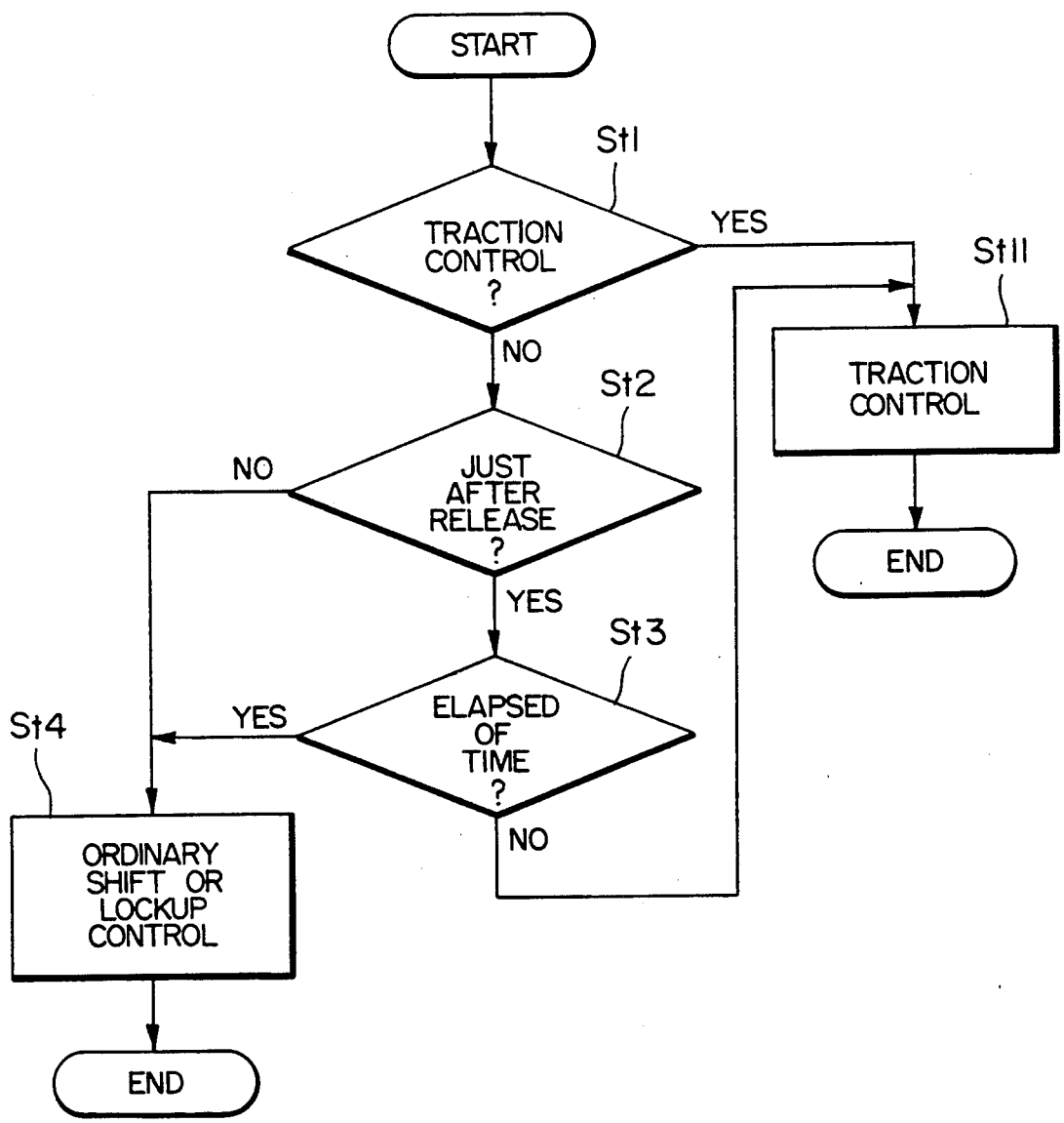
FIG. 5 is a flow chart of a transmission control routine for a microcomputer.
Figure 6B:
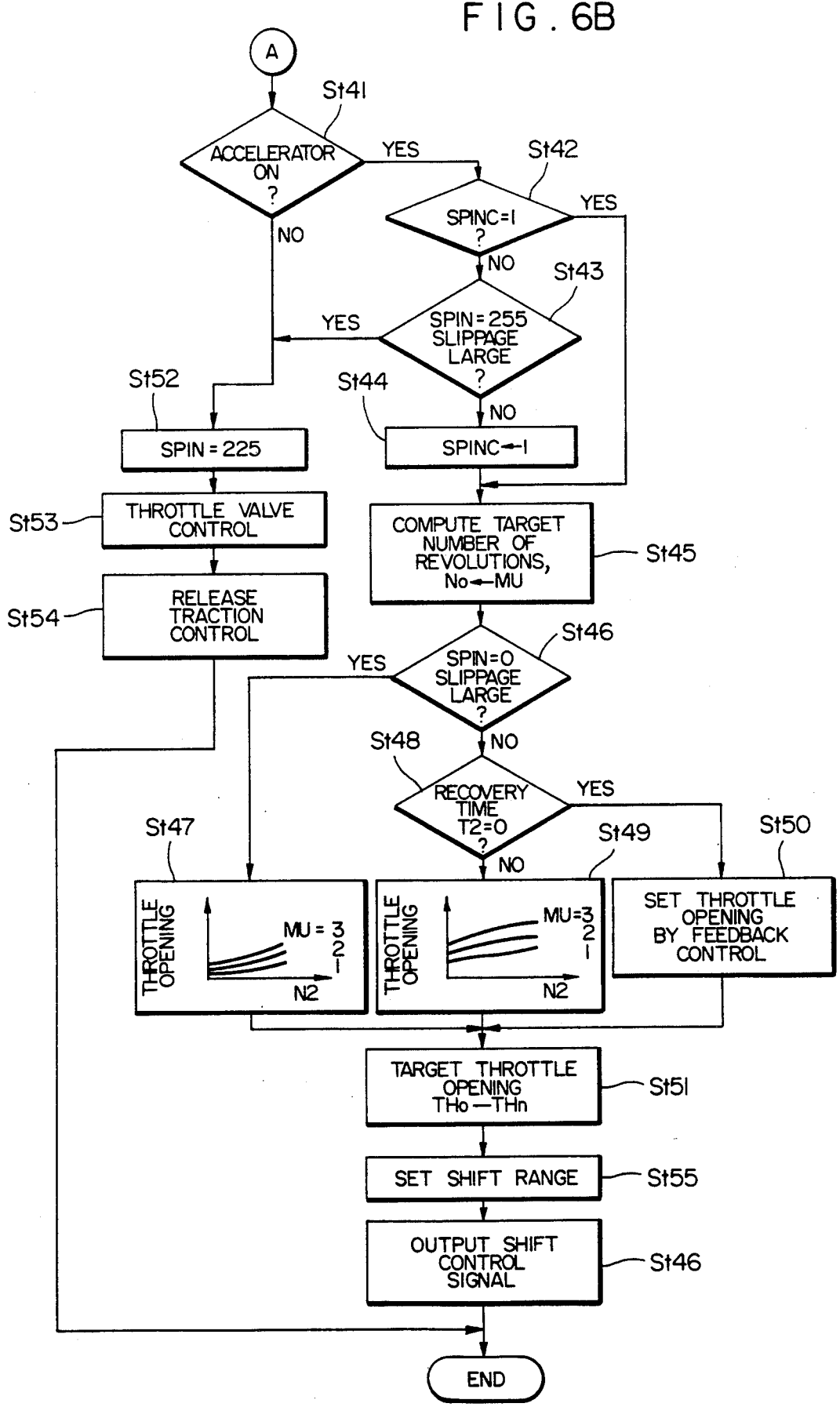
FIG. 6 is a flow chart of a traction control routine for the microcomputer.

The operation of the power train depicted in FIG. 1 is best understood by reviewing the FIGS. 5 and 6, which are flow charts illustrating a main routine and a subroutine for the microcomputers of the control units 13 and 14. Programming a computer is a skill well understood in the art. The following description is written to enable a programmer having ordinary skill in the art to prepare an appropriate program for the microcomputers of the control units 13 and 14. The particular details of any such program would, of course, depend upon the architecture of the particular computer selected.

Referring to FIG. 5, which is a flow chart of the main or general sequence routine for the microcomputers of the control units 13 and 14, the first step in step st1 is to make a decision to judge whether there is a demand for traction control for the automatic transmission according to a traction control signal TRC from the transistor T1 of the traction control unit 14. If the transistor T1 of the traction control unit 14 provides no traction control signal TRC, decisions are made to decide whether traction control has been removed and whether a predetermined time has elapsed in steps St2 and St3, respectively. If either the answer to the decision in step St2 is no indicating no, removal of traction control, or the answer to the decision in step St3 is yes, indicating the elapse of the predetermined time period, the transistor T1 of the traction control unit 14 provides the automatic transmission control unit 13 with a high level signal, which causes the automatic transmission to conduct the normal mode shift control according to the shift patterns or schedules shown in FIG. 3 in step St4. Then, the main routine ends. In the normal mode shift control, the hydraulic system 12 is controlled to cause the transmission 2 to shift itself to a particular shift range that is determined by comparing a vehicle operating condition defined by the vehicle speed N and engine load to shift patterns or schedules. The hydraulic system 12 itself may be controlled in the same manner as hydraulic systems previously known in the art and need not be described herein.

If the answer to the decision in step St1 indicates that the transistor T1 of the traction control unit 14 provides the automatic transmission control unit 13 with a traction control signal TRC, that is, there is a demand of traction control for the automatic transmission, or the answer to the decision St3 is no indicating, that the predetermined time period has not elapsed after the removal of traction control, then, the main routine to ends after a traction control subroutine is called for in step St11.

Referring to FIG. 6, which is a flow chart of the traction control subroutine, steps St12 to St20 are firstly executed to decide the extent of slippage of the traction wheels 3R from the difference between front and rear or driven and driving wheel speeds N2 and N1 and to make a preparatory calculation in order to estimate the friction coefficient of road surface Fc. The friction coefficient of road surface Fc is actually estimated in steps St31 to St33. Thereafter, a target throttle opening THo is calculated based on the decided extent of slippage of the traction wheels 3R in steps St41 to St56. According to the result of the target throttle opening calculation, traction shift control is conducted when the extent of slippage of the traction wheels 3R is high or moderate; normal shift control is conducted when the extent of slippage of the traction wheels 3R is low or no slippage of the traction wheels 3R occurs.

Figure 7:
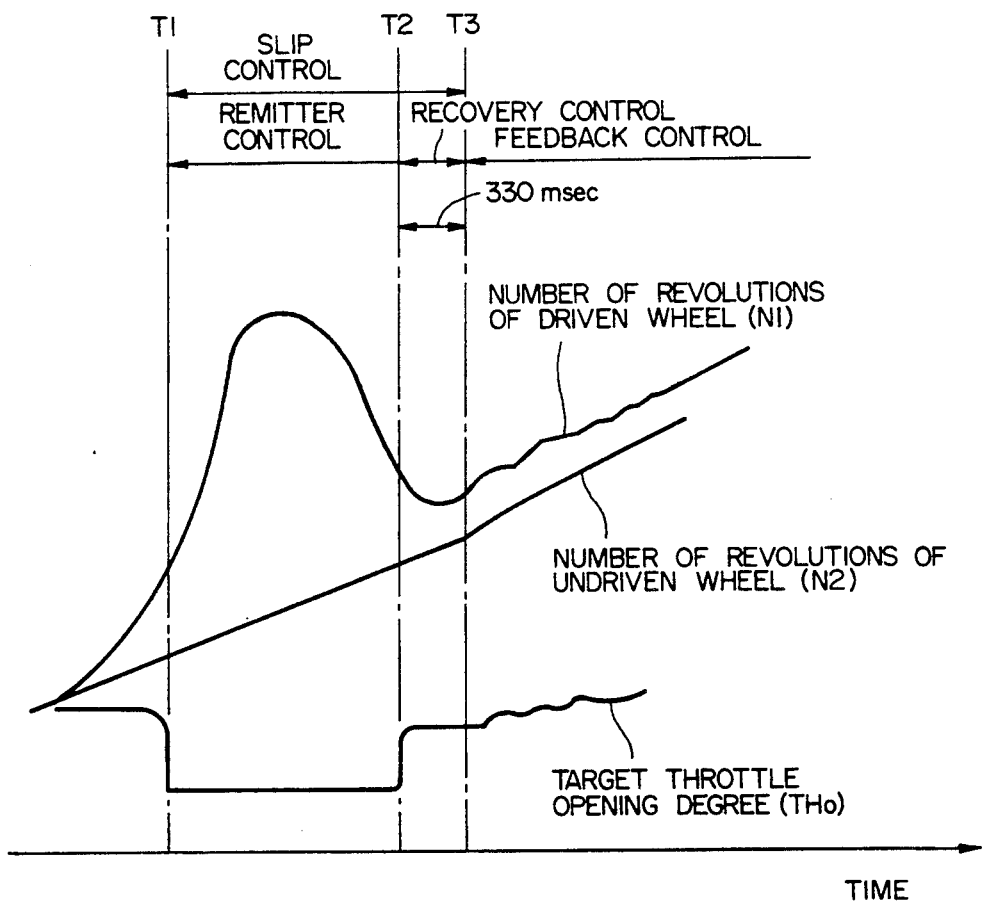
FIG. 7 is an explanatory diagram showing the traction control.

The operation of the power train of the present invention for executing a specific slip control explained in a diagram shown in FIG. 7 will be understood in more detail with reference to FIG. 6 which, as noted above, is a flow chart of the traction control subroutine. As shown, if it is decided in step St12 that the speed N1 of the traction wheels 3R is higher by a preselected large value than the speed N2 of the driven wheels 3F at a time T1, this indicates that a large extent of slippage of the traction wheels 3R has occurred. Then, a register SPIN is set to its state "0" indicating a large extent of slippage in step St19 if it has not been set to the state "0" indicating that the extent of slippage is large in step St18. If the answer to the decision in step St18 regarding the extent of slippage of the traction wheels 3R or after setting a time register TR1 to 500 msec. and a register N to the speed N2 of the driven wheels 3F in step St20, a decision is made in step St31 whether the time register TI has counted down the set time of 500 msec. If the answer to the decision is yes, the difference of the speed N2 of the driven wheel 3F from the former speed N2 of the driven wheels 3F set in the resistor RN is calculated as an increase of speed ΔN within the elapse of the set time of 500 msec. in step St32. The friction coefficient of road surface Fc is estimated, according to the increase of speed N thus calculated and the speed N2 of the driven wheels 3F, from a friction coefficient map previously given in step St33.

After the estimation of the friction coefficient of road surface Fc, a decision is made in step St41, based on the output from accelerator sensor 10 whether the vehicle is under acceleration. If the answer to the decision regarding acceleration is yes, a decision is made in step St42 whether a register SPINC has not been set to its state "0" which indicates that the automatic transmission is under the traction control. If the answer to the register SPINC is no, a decision is made in step St43 whether the register SPIN has been set to or a value of "225". More particularly, if the answer to the decision in step S42 is no, a decision is made in step St43 whether the register SPIN has been set to its state of "225", indicating that the extent of slippage is small. Thereafter, a target speed No (which is represented by Mu-1, Mu-2 or Mu-3) necessary to remove slippage is calculated on the basis of the estimated friction coefficient of road surface Fc after setting the register SPINC to its state "0" in step St44 or if the answer to the decision is step St42 is yes. If it is decided in step St46 that the register SPIN has been set to its state "0", step St47 is taken to determine a throttle opening THn of the throttle valve 5 necessary to provide the target speed No according to the speed N2 of the driven wheels 3F from a throttle opening curve previously given in step St47. This is because during the traction control, the traction wheels 3F are subjected to a large extent of slippage. Throttle opening curves are selectively used according to the target speeds No (Mu-1, Mu-2 and Mu-3) to determine a proper throttle opening THn. The step St47 is taken to provide an upper limit of the throttle opening THn which is set at a lower level against the same amount of operated stroke of the accelerator as compared with the state wherein no slippage occurs. The throttle opening THn, thus determined, is set, in step St51, as a target throttle opening THo to which the throttle valve is controlled to open. According to the target throttle opening THo and the speed N2 of the driven wheel 3F, a proper shift range is selected from the traction mode shift range map shown in FIG. 4 in step St55 so as to provide a control signal for traction control and shifting or locking control in step St56. As is apparent from the above, during the traction control between the times T1 and T2, the throttle valve is opened to a throttle opening TH lower as compared to the state wherein some slippages occur.

When the speed N1 of the traction wheels 3R gradually drops down to a speed shown in FIG. 7 by the time T2 so as thereby to reduce slippage, the answer to the decision in step St12 becomes no. This indicates that the extent of slippage of the traction wheels 3R is moderate or small in extent. If in fact the answer to the decision regarding the difference between the speeds N1 and N2 of the traction and driven wheels 3R and 3F is no, a decision is made in step St13 whether the register SPIN has been set to its state "0" indicating a large extent of slippage If the register set to 330 msec. in step St14 If the answer to the decision in step St13 is no or, after the setting of the time register in step St14, when the answer to the decision in step St13 is yes, a decision is made in step St15 whether the difference between the speeds N1 and N2 of the traction and driven wheels 3R and 3F is higher than a preselected moderate value NM so as thereby to determine the extent of slippage to be moderate or small. According to the answer to the decision in step St15, the resistor SPIN is set to its state of "100" indicating a moderate slippage in step St16 or its state of "225" indicating a small slippage in step St17.

Between the times T2 and T3, after setting the register SPIN in step St1 6 or St1 7, a friction coefficient Fc of road surface is estimated through steps St31 to St33 and a target speed No is calculated through steps St41 to St45. Until the time period of 330 msec., set in time resister TR2, has elapsed, a throttle opening THn of the throttle valve 5 is determined according to the target speed No and speed N2 of the driven wheels 3F in step St49.

The throttle opening THn thus determined is set as a target throttle opening THo in step St51; a proper shift range is selected from the traction mode shift range map shown in FIG. 4 in step St55 according to the target throttle opening THo and the speed N2 of the driven wheel 3F so as to provide a control signal for traction control and shift or lockup control in step St56. During the traction control between the times T2 and T3, the throttle valve is opened to an approximately intermediate opening between openings provided in the ordinary control and the traction control taken between the times T1 and T2.

On the other hand, after the elapse of the time period of 330 msec. set in the timer register TR2, the throttle valve 5 is controlled to open according to operated strokes of the accelerator pedal 9 in feedback control in step St50. That is, the throttle valve 5 is feedback controlled to open to a target throttle opening THo so as to provide a target speed No which is the sum of the speed N2 of the driven wheels 3F and the increase of speed N depending upon the estimated friction coefficient of road surface Fc. The feedback control is executed by the use of PI-PD (Integration-Differential) control method given by the following formula:

$$THo = STAG + P1(ENWR + ENWR1) + I \times ENWR - D(PRWR - PRWR1) - (PRWR1 - PRWR2)] - P2(PRWR - PRWR1)$$

where
STAG is a target throttle opening set in a control cycle one cycle before;
PRWR is a speed of the traction wheel in a current control cycle;
PRWR1 is a speed of the traction wheel in a control cycle one cycle before;
PRWR2 is a speed of the traction wheel in a control cycle two cycles before;
ENWR is the difference between a target speed and the current speed PRWR of the traction wheel;
ENWR1 is the difference between a target speed and the current speed PRWR of the traction wheel in a control cycle one cycle before;
P1 is a proportional gain effecting upon the responsibility of the throttle valve;
I is an integral gain relating to the responsibility of the throttle valve;
P2 is a proportional gain responsible to the change of gain of the vehicle; and
D is a differential gain responsible to the change of gain of the vehicle.

The application of the PI-PD control method not only ensures that the throttle valve follows up to a target opening and act with a high stability of action by the inclusion of the proportional gain Pl and integral gain I, but also compensates the stability of action of the throttle valve against disturbance from the change of dynamic characteristic of the throttle valve itself and the vehicle by the inclusion of the proportional gain P2 and differential gain D.

In the same manner as taking step St47 or St49, after step St50, the throttle opening THn is set as a target throttle opening THo in step St51; a proper shift range is selected from the traction mode shift range map shown in FIG. 4 in step St55 according to the target throttle opening THo and the speed N2 of the driven wheel 3F so as to provide a control signal for traction control and shift or lockup control in step St56.

In any event of, taking step St47, St49 or St50, the control signal provided in step St56 causes the traction control unit 14 to output to the automatic transmission control unit 13 a low level of shift control mode signal TRC from the transistor T1, an appropriate combination of signals from the transistors T2 and T3, or a lockup signal from the transistor T4.

Figure 8:
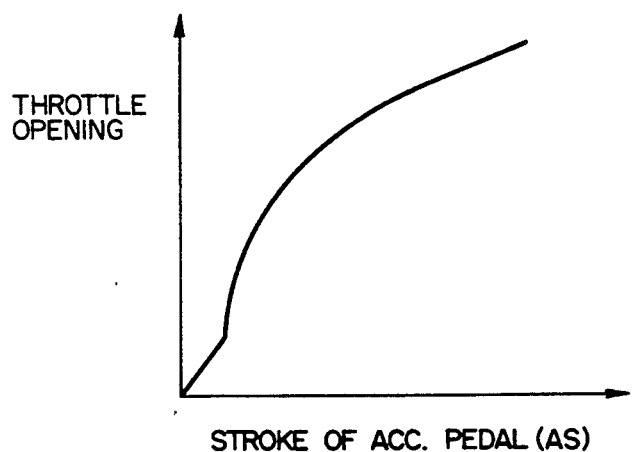
FIG. 8 is a diagram showing a characteristic curve of the opening of throttle valve relative to the stroke of operation of an accelerator pedal.

If the answer to the decision regarding the extent of slippage in step St43, is yes the throttle opening of the throttle valve 5 is controlled according to an operated stroke of the accelerator pedal 9 as shown in FIG. 8 in step St53 after setting the register SPIN to its state "225" in step St52. Then, the traction control unit 14 provides the automatic transmission control unit 13 with a high level of shift control mode signal TRC from the transistor T1.

It is to be understood that although the invention has been described in detail with respect to a preferred embodiment, nevertheless, various other embodiments and variants are possible which are within the spirit and scope of the invention, and such are intended to be covered by the following claims.

What is claimed is:

1. A power train control system for a vehicle, having at least a driven wheel and a traction wheel, for transmitting power from a vehicle engine to said traction wheel through an automatic transmission, said control system shifting a speed range of said automatic transmission according to shift patterns and comprising:
first speed detecting means for detecting a first rotational speed transmitted to said traction wheel;
second speed detecting means for detecting a second rotational speed of said driven wheel;
load detecting means for detecting a load on said vehicle engine;
slippage determining means for determining slippage of said traction wheel; and
traction control means for causing said automatic transmission to shift its speed range according to a normal shift control by comparing a vehicle operating condition defined by said first rotational speed and the load on the vehicle engine with a first set of shift patterns when said slip determining means determines there is low slippage of said traction wheel, and according to a traction shift control by comparing a vehicle operating condition defined by said second rotational speed and the load on said vehicle engine with a second set of shift patterns when said slip determining means determines there is high slippage of said traction wheel, thereby eliminating said slippage.

2. A power train control system as defined in claim 1, wherein said slip determining means determines the difference between rotational speeds of said traction and driven wheels as being said slippage of said traction wheel.

3. A power train control system as defined in claim 2, wherein said slip determining means includes speed sensors for detecting rotational speeds of said traction and driven wheels, respectively.

4. A power train control system as defined in claim 1, wherein said load on said vehicle engine is determined based on an opening of a throttle valve of said vehicle engine.

5. A power train control system as defined in claim 1, wherein under said traction shift control, said load on said vehicle engine is determined according to an operated stroke of an accelerator pedal of said vehicle.

6. A power train control system as defined in claim 1, further comprising a traction control unit in which data of said second set of shift patterns is stored and an automatic transmission control unit in which data of said first set of shift patterns is stored.

7. A power train control system as defined in claim 6, wherein said traction control unit provides said automatic transmission control unit with a shift range instruction signal.

8. A power control system as defined in claim 7, wherein said automatic transmission control unit causes said automatic transmission to shift to a shift range instructed by said shift range instruction signal prior to said shift patterns stored therein.

9. A power train control method for a vehicle, having at least a driven wheel and a traction wheel, for transmitting power from a vehicle engine to said traction wheel through an automatic transmission, comprising the steps of:
    detecting a first rotational speed transmitted to said traction wheel;
    detecting a second rotational speed of said driven wheel;
    detecting a load on said vehicle engine;
    determining slippage of said traction wheel; and
    shifting a speed range of said automatic transmission according to a normal shift control by comparing a vehicle operating condition defined by said first rotational speed and the load on the vehicle engine with a first set of shift patterns when said slip determining means determines there is low slippage of said traction wheel; and
    shifting a speed range of said automatic transmission according to a traction shift control by comparing a vehicle operating condition defined by said second rotational speed and the load on said vehicle engine with a second set of shift patterns when said slip determining means determines there is high slippage of said traction wheel, thereby eliminating said slippage.

10. A power train control method as defined in claim 9, wherein said slippage is determined from a difference between said first rotational speed and said second rotational speed.

11. A power train control method as defined in claim 9, wherein said load on said vehicle engine is determined based on an opening of a throttle valve of said vehicle engine.

12. A power train control method as defined in claim 9, wherein under said traction shift control, said load on said vehicle engine is determined according to an operated stroke of an accelerator of said vehicle.

* * * * *